(12) United States Patent
Akiyama

(10) Patent No.: US 7,046,301 B2
(45) Date of Patent: May 16, 2006

(54) VERTICAL SYNCHRONOUS SIGNAL DETECTION CIRCUIT

(75) Inventor: Takaaki Akiyama, Tokyo (JP)

(73) Assignee: Oki Electric Co., Ltd., Tokyo (JP)

( * ) Notice: Subject to any disclaimer, the term of this patent is extended or adjusted under 35 U.S.C. 154(b) by 572 days.

(21) Appl. No.: 10/396,812

(22) Filed: Mar. 26, 2003

(65) Prior Publication Data
US 2004/0036802 A1  Feb. 26, 2004

(30) Foreign Application Priority Data
Aug. 20, 2002  (JP) ............................. 2002-239755

(51) Int. Cl.
*H04N 5/10* (2006.01)
(52) U.S. Cl. ...................... 348/529; 348/534
(58) Field of Classification Search ............... 348/529, 348/530, 531, 532, 534, 533, 525, 526, 547, 348/548; H04N 5/10
See application file for complete search history.

(56) References Cited

U.S. PATENT DOCUMENTS

| | | | | | |
|---|---|---|---|---|---|
| 3,809,808 A | * | 5/1974 | Arpin | .......................... | 348/532 |
| 4,858,008 A | * | 8/1989 | Sieben et al. | ................ | 348/526 |
| 5,031,041 A | * | 7/1991 | Fling | ........................... | 348/529 |
| 5,576,770 A | * | 11/1996 | Rumreich | .................... | 348/525 |
| 5,754,251 A | * | 5/1998 | Hulvey | ........................ | 348/529 |

FOREIGN PATENT DOCUMENTS

| | | |
|---|---|---|
| JP | 05-022627 | 1/1993 |
| JP | 05-276407 | 10/1993 |
| JP | 08-051555 | 2/1996 |
| JP | 09-214998 | 8/1997 |
| JP | 09-233364 | 9/1997 |
| JP | 11-196288 | 7/1999 |

* cited by examiner

*Primary Examiner*—Michael H. Lee
(74) *Attorney, Agent, or Firm*—Rabin & Berdo, P.C.

(57) ABSTRACT

A vertical synchronous signal detection circuit includes an analog-digital converter, an average calculation circuit and a compare circuit. The analog-digital converter receives a composite video signal and converts the video signal into a digital signal having a vertical synchronizing pulse. The average calculation circuit is coupled to receive the digital signal. The average calculation circuit calculates an average level of the vertical synchronizing pulse within a predetermined period. The compare circuit is connected to the average calculation circuit. The compare circuit compares a threshold level received thereto with the average level and outputs a synchronous detect signal when the average level falls below the threshold level.

22 Claims, 4 Drawing Sheets

VERTICAL SYNCHRONOUS SIGNAL DETECTION CIRCUIT

BACKGROUND OF THE INVENTION

The present invention relates to a vertical synchronous signal detection circuit for detecting a vertical synchronizing pulse from an input signal digitized in a digital video decoder for generating a digital video signal from a composite video signal.

A conventional vertical synchronous signal detection circuit comprises a comparator, a change detecting unit, a detection counter, and a protective counter.

The comparator compares an input signal sampled with a clock signal of, for example, 13.5 MHz and converted to digital values with a predetermined threshold level set between a retrace blanking level and a synchronous level and outputs a compare signal CP corresponding to the result of comparison. The change detecting unit detects timing at which the input signal falls below the threshold level, and outputs a change signal. The compare signal and the change signal are supplied to the detection counter.

The detection counter starts counting based on the change signal to thereby count the number in which the input signal that falls below the threshold level, is successive. When the so-counted value reaches a constant number (e.g., 350), the detection counter outputs a detect signal. On the other hand, the protective counter is used to protect against a malfunction of the detection counter due to noise. Further, the protective counter counts the number in which the input signal that falls above the threshold level is made successive, and causes the detection counter to continue counting unless the count value exceeds a constant value (e.g., 15).

In the vertical synchronous signal detection circuit, the input signal converted to the digital values is inputted to the comparator and the change detecting unit. The input signal is compared with the threshold level by the comparator, and the compare signal corresponding to the result of comparison is supplied to the detection counter and the protective counter. The timing in which the input signal falls below the threshold level, is detected by the change detecting unit, and the change signal is supplied to the detection counter.

Thus, the detection counter starts counting from the timing in which the input signal falls below the threshold level. When the input signal falls above the threshold level during the counting of the detection counter, the protective counter performs counting. Unless the count value of the protective counter exceeds 15, the detection counter is not reset and continues counting. When the count value of the detection counter reaches 350, the input signal is judged to be a vertical synchronizing pulse and hence a detect signal is outputted from the detection counter.

On the other hand, when the time at which the input signal falls above the threshold level, becomes long, and the count value of the protective counter exceeds 15 during the counting of the detection counter, the detection counter is reset to stop counting. The once-deactivated detection counter is not re-started till timing in which the input signal falls below the threshold level again.

Thus, even if the input signal instantaneously falls above the threshold level due to noise during a period of the vertical synchronizing pulse, the counting of the detection counter is protected by the protective counter and continued if such a period falls within a predetermined time. Thus, even if a composite video signal is mixed with noise due to a weak electric field or the like, the vertical synchronizing pulse can be detected.

However, the conventional vertical synchronous signal detection circuit is accompanied by the following problems. Namely, when such noise as to successively exceed a predetermined number of pixels (e.g., 15) exists during a vertical synchronous pulse period of the input signal, the detection counter is deactivated so that the vertical synchronizing pulse cannot be detected.

SUMMARY OF THE INVENTION

The present invention provides a vertical synchronous signal detection circuit capable of reliably detecting a vertical synchronizing pulse even from a composite video signal with much noise.

A vertical synchronous signal detection circuit of the present invention, for detecting a vertical synchronizing pulse from an input signal obtained by digitizing a composite video signal in accordance with a clock signal, comprises an average calculation unit which calculates an average value of levels of the input signal in every predetermined periods respectively substantially equal to periods of synchronous levels in the vertical synchronizing pulse, and a compare unit which compares the average value with a predetermined threshold level for each predetermined period and outputs a synchronous detect signal when the average value falls below the threshold level.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

A vertical synchronizing pulse signal in a composite video signal of an NTSC system will first be described using a waveform diagram shown in FIG. 1 to help the understanding of the present invention.

Figure 1:
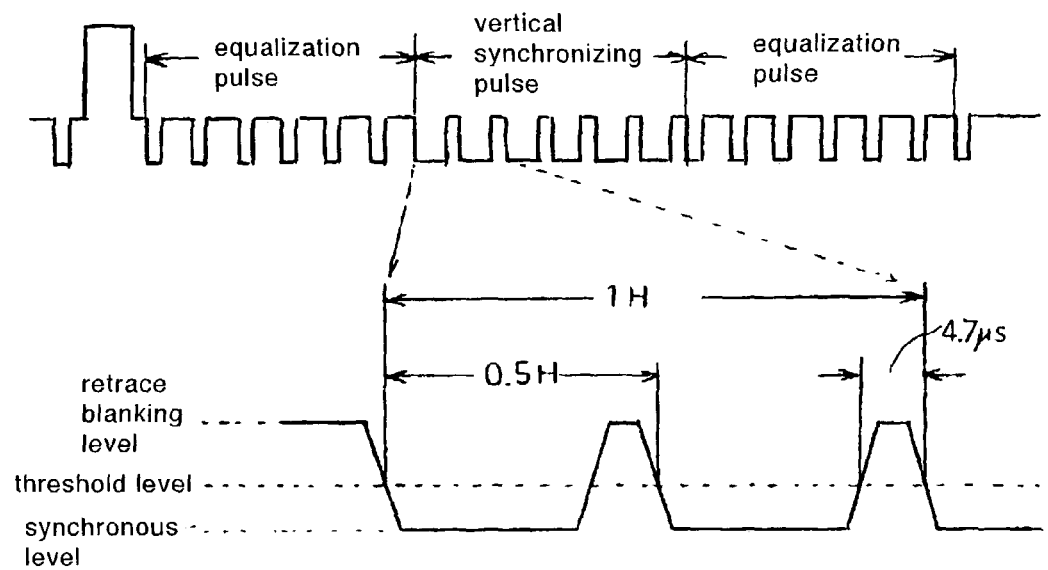
FIG. 1 is a signal waveform diagram showing a vertical synchronizing pulse in a composite video signal of an NTSC system.

As shown in FIG. 1, an equalization pulse is continuous at a frequency equal to twice a horizontal synchronizing frequency (abut 15.75 kHz) during initial three horizontal scanning periods (3H) of a vertical retrace blanking period, and a vertical synchronizing pulse set as a pulse train, having positive cut pulses narrow in width is continuous for the three horizontal scanning periods at the frequency equal to twice the horizontal synchronizing frequency similarly after the equalization pulse. Further, an equalization pulse or the like is continues for a predetermined time alone after the vertical synchronizing pulse. In the vertical synchronizing pulse, each cut pulse interval is brought to a retrace blanking level lower than a black level, and intervals other than the cut pulse intervals are respectively brought to a synchronous level further lower than the retrace blanking level.

A digital video decoder samples a composite video signal and performs conversion to pixels corresponding to digital values, and thereafter performs detection of vertical and horizontal synchronous signals and extraction of a luminance signal and a color signal or the like. When the frequency of a sampling clock signal is set to 13.5 MHz, for example, one line results in about 858 pixels. Since the width of each cut pulse is about 4.7 µs, the cut pulse corresponds to 64 pixels, and the interval of each synchronous level corresponds to 365 pixels. Since the synchronous level is not keep continuous over 365 pixels except for the vertical synchronizing pulse where the composite video signal is digitized in this way, the vertical synchronizing pulse can be detected using it.

Preferred embodiments of the present invention will next be described in detail with reference to the accompanying drawings.

Figure 2:
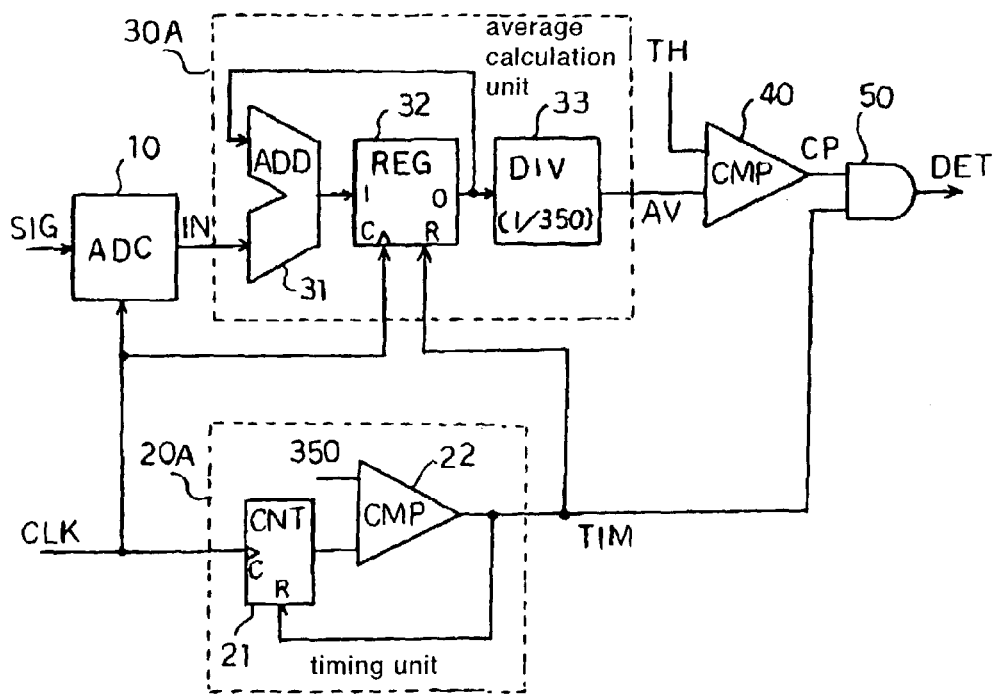
FIG. 2 is a configurational diagram of a vertical synchronous signal detection circuit illustrating a first embodiment of the present invention.

FIG. 2 is a configurational diagram of a vertical synchronous signal detection circuit showing a first embodiment of the present invention.

The vertical synchronous signal detection circuit has an analog-to-digital converter (hereinafter called an "ADC") 10 which samples, for example, a composite video signal SIG of an NTSC system with a clock signal CLK of 13.5 MHz and converts the same to a digital input signal IN, and a timing unit 20A which generates a timing signal TIM, based on the clock signal CLK.

The timing unit 20A outputs the timing signal TIM for vertical synchronous signal detection in a predetermined cycle defined in every 350 clocks and comprises a counter (CNT) 21 which counts the clock signal CLK, and a comparator 22 which compares a count value of the counter 21 with a constant number (350 in the present embodiment). The comparator 22 outputs the timing signal TIM when the two input values have coincided with each other.

Further, the vertical synchronous signal detection circuit has an average calculation unit 30A which calculates an average value AV of the input signal IN converted by the ADC 10. The average calculation unit 30A comprises an adder (ADD) 31, a register (REG) 32, and a divider 33. The adder 31 adds the input signal IN supplied from the ADC 10 and the corresponding accumulated value held in the register 32. The result of addition by the adder 31 is held again in the register 32, based on the clock signal CLK. The divider 33 divides the accumulated value held in the register 32 by 1/350 and outputs the result of division as the average value AV. The accumulated value of the register 32 is reset every 350 clocks in response to the timing signal TIM.

The comparator 40 compares the average value AV with a threshold level TH and outputs a compare signal CP corresponding to the result of comparison. Incidentally, the threshold level TH is set to a predetermined value (e.g., an intermediate value) between the retrace blanking level and the synchronous level as shown in FIG. 1. When the average value AV is smaller than the threshold level TH, the comparator 40 outputs a compare signal CP having a level "H". The output of the comparator 40 is connected to a first input of a two input AND gate (hereinafter called an "AND") 50. A second input of the AND 50 is supplied with the timing signal TIM of the timing unit 20A.

The operation of the vertical synchronous signal detection circuit will next be explained.

A composite video signal SIG is sampled according to a clock signal CLK and then converted to a digital input signal IN, followed by supply to the average calculation unit 30A. In the average calculation unit 30A, the adder 31 adds the input signal IN and the corresponding accumulated value held in the register 32. The result of addition by the adder 31 is held again in the register 32 according to the clock signal CLK.

The accumulated value held in the register 32 is divided by 1/350 by means of the divider 33, and the result of division by the divider 33 is supplied to the comparator 40 as an average value AV. The average value AV and a threshold level TH are compared by the comparator 40, and a compare signal CP is supplied to the first input of the AND 50. The second input of the AND 50 is supplied with a timing signal TIM sent from the timing unit 20A. However, when the value of the counter 21 of the timing unit 20A is less than 350, the timing signal TIM results in a level "L". Accordingly, a detect signal DET outputted from the AND 50 at this time goes "L" regardless of the compare signal CP.

When accumulated values of successive 350 input signals IN are held in the register 32 of the average calculation unit 30A in response to a 350th clock signal CLK, an average value AV outputted from the average calculation unit 30A results in an accurate average value of the input signals IN lying during this period. The average value AV is compared with the corresponding threshold level TH by the comparator 40, and the resultant compare signal CP is supplied to the AND 50.

In the timing unit 20A on the other hand, the count value of the counter 21 results in 350, and the timing signal TIM outputted from the comparator 22 goes "H". The timing signal TIM is supplied to the AND 50, and the detect signal DET outputted from the AND 50 coincides with the compare signal CP. Namely, if the average value VA of the 350 input signals IN is smaller than the threshold level TH, then the detect signal DET results in "H". If the average value AV is larger than the threshold level TH, then the detect signal DET results in "L".

Afterwards, the counter 21 and the register 32 are reset by the timing signal TIM and hence a vertical synchronous signal detecting operation similar to the above is periodically repeated.

As described above, the vertical synchronous signal detection circuit according to the first embodiment has the average calculation unit 20A which calculates an average value AV of input signals IN in a period equal to about one-half a horizontal scanning period, and compares the calculated average value AV with the corresponding threshold level TH and thereby outputs a detect signal DET. The vertical synchronous signal detection circuit has the advantage that since synchronous levels in a vertical synchronization period of a composite video signal SIG in a weak electric field result in a constant value or less if averaged even if noise is superimposed thereon, a suitable threshold level is set, and a vertical synchronizing pulse can be reliably detected by taking the average of such a long period.

Figure 3:
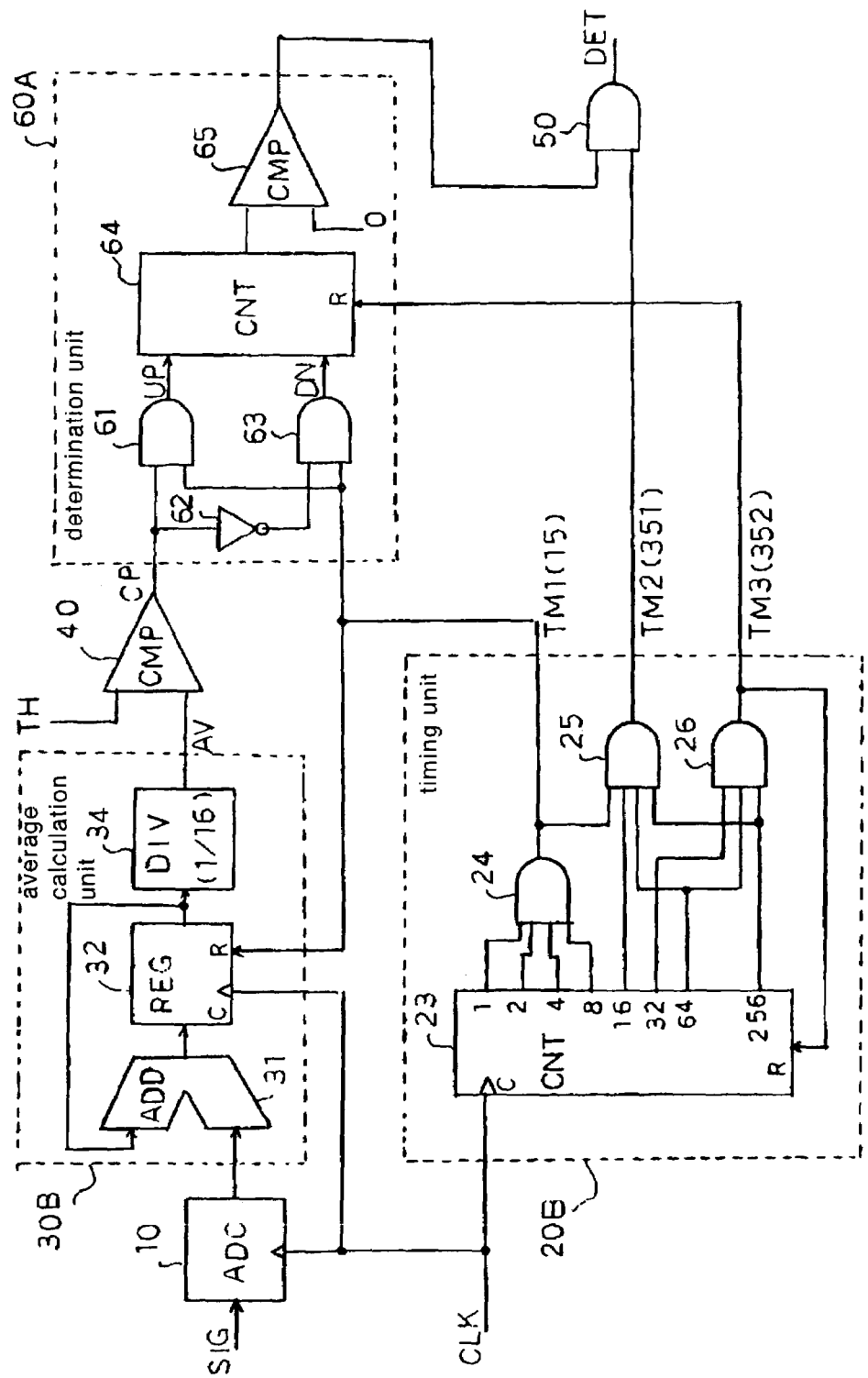
FIG. 3 is a configurational diagram of a vertical synchronous signal detection circuit depicting a second embodiment of the present invention.

FIG. 3 is a configurational diagram of a vertical synchronous signal detection circuit showing a second embodiment of the present invention. Elements of structure common to those in FIG. 2 are respectively identified by common reference numerals.

The vertical synchronous signal detection circuit has an ADC 10 which samples a composite video signal SIG with a clock signal CLK and converts it into a digital input signal IN, and a timing unit 20B which generates timing signals TM1, TM2 and TM3, based on the clock signal CLK.

The timing unit 20B comprises a 9-digit binary counter 23 which counts the clock signal CLK, and ANDs 24 through 26 which decode a count value of the binary counter 23 and thereby output timing signals TM1 through TM3, respectively. The AND 24 sets the timing signal TM1 to "H" each time the count value of the binary counter 23 reaches a multiple of 16. Further, the ANDs 25 and 26 respectively output timing signals TM2 and TM3 of "H" when the count value of the binary counter 23 reaches 351 and 352. The timing signal TM3 is supplied to a reset terminal R of the binary counter 23, whereby the count value of the binary counter 23 is repeated between 0 to 351.

Further, the vertical synchronous signal detection circuit has an average calculation unit 30B which calculates an average value AV of the input signal IN supplied from the ADC 10. The average calculation unit 30B is provided with a divider 34 which performs 1/16 division and thereby outputs an average value AV, as an alternative to the divider 33 of the average calculation unit 30A in FIG. 1. The register 32 is reset every 16 clocks in response to the timing signal TM1.

The comparator 40 compares the average value AV and a threshold level TH and thereby outputs a compare signal CP. The output of the comparator 40 is connected to a determination unit 60A. The determination unit 60A comprises ANDs 61 and 63, an inverter 62, a counter 64 and a comparator 65. The compare signal CP is supplied to a first input of the AND 61 and to a first input of the AND 63 through an inverter 62. The timing signal TM1 is supplied to second inputs of the ANDs 61 and 63, and the outputs of these ANDs 61 and 63 are respectively connected to input terminals U and D of the counter 64.

When the input terminal U is supplied with a pulse, the counter 64 increments its count value by 1. When the input terminal D is supplied with a pulse, the counter 64 decrements its count value by 1. A reset terminal R of the counter 64 is supplied with the timing signal TM3, and the output of the counter 64 is connected to the comparator 65. The comparator 65 outputs a signal of "H" when the count value of the counter 64 is positive. The output of the comparator 65 is connected to a first input of an AND 50, and a second input of the AND 50 is supplied with the timing signal TM2. Further, the AND 50 outputs a detect signal DET.

The operation of the vertical synchronous signal detection circuit will next be explained.

A clock signal CLK is counted by the binary counter 23 of the timing unit 20B. Thus, a timing signal TM1 is outputted in every 16 clocks and a timing signal TM2 is outputted at a 352nd clock. When a timing signal T3 rises with the rising edge of a 353rd clock, the binary counter 23 is instantaneously reset, so that its count value returns to 0.

On the other hand, a composite video signal SIG is converted into a digital input signal IN according to the clock signal CLK, which in turn is supplied to the average calculation unit 30B. The average calculation unit 30B effects accumulation/addition on the input signals IN according to the clock signal CLK. The divider 34 divides the so-accumulated value by 1/16 and supplies the result of division to the comparator 40 as an average value AV. The comparator 40 compares the average value AV and a threshold level TH and supplies a compare signal CP to the determination unit 60A.

In the determination unit 60A, a pulse signal is outputted from either one of the ANDs 61 and 63 in accordance with the level of the compare signal CP when the timing signal TM1 is brought to "H" in every 16 clocks. Namely, when the average value AV is smaller than the threshold level TH, the compare signal CP reaches "H", so that a pulse signal UP is outputted from the AND 61. On the other hand, when the average value AV is larger than the threshold level TH, the compare signal CP reaches "L", so that a pulse signal DN is outputted from the AND 63.

The pulse signals UP and DN are supplied to the counter 64, where a count value thereof increases or decreases according to the timing signal TM1. The count value of the counter 64 is compared by the comparator 65. When the count value is positive, a signal outputted from the comparator 65 goes "H", whereas when the count value is 0 or negative, a signal outputted from the comparator 65 reaches "L".

When the timing signal TM2 goes "H" at a 352nd clock of the clock signal CLK, a signal outputted from the comparator 65 is outputted from the AND 50 as a detect signal DET.

Thus, if the number of times of "H" in the compare signal CP outputted for each timing signal TM1 is larger than the number of times of "L", then the count value of the counter 64 becomes positive so that a detect signal DET of "H" is outputted. If the number of times of "H" is smaller than the number of times of "L", then the count value of the counter 64 becomes negative so that no detect signal DET is outputted.

Thereafter, the counters 23 and 64 are respectively reset by the timing signal TM3 at a 353rd clock of the clock signal CLK, so that a vertical synchronous signal detecting operation similar to the above is periodically repeated.

As described above, the vertical synchronous signal detection circuit according to the second embodiment has the average calculation unit 30B which calculates an average value AV of input signals IN in every 16 clocks, and the determination unit 60A which compares the average value AV and a threshold level TH and counts the result of comparison to determine it. Thus, the accumulated value of the average calculation unit 30B can be reduced as compared with the average calculation unit 30A shown in FIG. 2, and an advantage similar to the first embodiment can be obtained on a small circuit scale.

Figure 4:
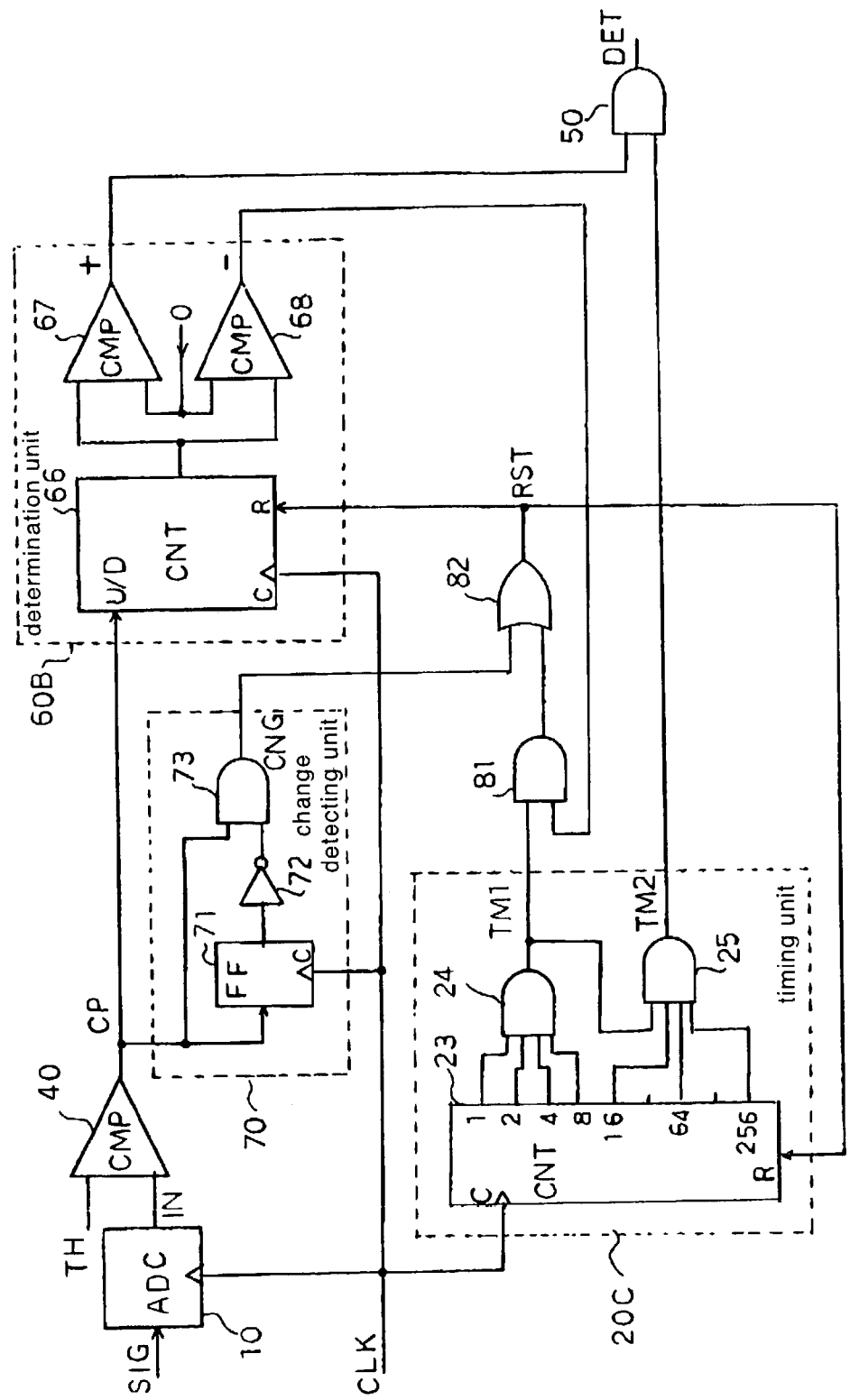
FIG. 4 is a configurational diagram of a vertical synchronous signal detection circuit showing a third embodiment of the present invention.

FIG. 4 is a configurational diagram of a vertical synchronous signal detection circuit showing a third embodiment of the present invention. Elements of structure common to those in FIG. 3 are respectively identified by common reference numerals.

The vertical synchronous signal detection circuit includes an ADC 10 which samples a composite video signal SIG with a clock signal CLK and converts it into a digital input signal IN, and a timing unit 20C which generates timing signals TM1 and TM2, based on the clock signal CLK. The timing unit 20C is one wherein the AND 26 for generating the timing signal TM3 is omitted from the timing unit 20B in FIG. 3.

The vertical synchronous signal detection circuit has a comparator 40 which compares the input signal IN converted by the ADC 10 with a threshold level TH and thereby outputs a compare signal CP. The compare signal CP is supplied to a determination unit 60B.

The determination unit 60B comprises an updown counter 66 and comparators 67 and 68. The updown counter 66 increments a count value with timing of the clock signal CLK supplied to a clock terminal C when the compare signal CP supplied to a control terminal U/D is of "H", and decrements a count value when the compare signal CP is of "L". The count value of the updown counter 66 is supplied to the comparators 67 and 68. The comparator 67 outputs a signal SP of "H" when the count value is positive, and the comparator 68 outputs a signal SM of "H" when the count value is 0 or negative.

The signal SP is ANDed with the timing signal TM2 by an AND 50, and the result of ANDing is outputted as a detect signal DET. The signal SM is ANDed with the timing signal TM1 by an AND 81, and the result of ANDing is supplied to a first input of a logic OR gate (hereinafter called "OR") 82.

Further, the vertical synchronous signal detection circuit has a change detecting unit 70 which detects rise timing of a vertical synchronizing pulse, based on a change in compare signal CP and outputs a change signal CNG. The change detecting unit 70 comprises a flip-flop (hereinafter called "FF") 71 which latches the compare signal CP according to the clock signal CLK and delays it by one clock, an inverter 72 which inverts a signal outputted from the FF 71, and an AND 73 which ANDs a signal outputted from the inverter 72 and the compare signal CP to output a change signal CNG.

The change signal CNG is supplied to a second input of the OR 82, and a reset signal RST for a binary counter 23 and the updown counter 66 is outputted from the output of the OR 82.

The operation of the vertical synchronous signal detection circuit will next be described.

A composite video signal SIG is converted into a digital input signal IN according to a clock signal CLK. The comparator 40 compares the input signal IN with a threshold level TH and supplies a compare signal CP corresponding to the result of comparison to the determination unit 60B and the change detecting unit 70.

The change detecting unit 70 detects timing necessary for an input signal IN to fall to the threshold level Th or less, i.e., timing provided to change the compare signal CP from "L" to "H". Due to the falling edge of the input signal IN, a change signal CNG is outputted from the change detecting unit 70, so that the binary counter 23 of the timing unit 20C and the updown counter 66 of the determination unit 60B are reset.

In the timing unit 20C, the clock signal CLK is counted by the binary counter 23, so that a timing signal TM1 is outputted in every 16 clocks and a timing signal TM2 is outputted at a 352nd clock. This operation is continuously performed unless a reset signal RST is supplied. When the reset signal RST is supplied, the count value of the binary counter 23 is brought to 0, so that the circuit is rebooted.

On the other hand, in the determination unit 60B, a count value of the updown counter 66 is incremented one by one with the timing of the clock signal CLK when the compare signal CP is of "H", i.e., the input signal IN is greater than or equal to the threshold level TH. When the compare signal CP is "L", i.e., the input signal IN exceeds the threshold level TH in reverse, the count value is decremented one by one with the timing of the clock signal CLK.

When the timing signal TM1 is outputted at a 16th clock, a signal SM outputted from the comparator 68 results in EH" when the count value of the updown counter 66 is 0 or negative. Therefore, a reset signal RST is outputted from the AND 81 through the OR 82 so that the timing unit 20C and the determination unit 60B are respectively restored to an initial state. Since the signal SM goes "L" when the count value of the updown counter 66 is positive upon the output of the timing signal TM1, no reset signal RST is outputted. Accordingly, the operations of the timing unit 20C and the determination unit 60B will be continued as they are.

If the count value of the updown counter 66 is positive when the timing signal TM2 is outputted at the 352nd clock, then a signal SP goes "H". Thus, a detect signal DET is outputted from the AND 50.

As described above, the vertical synchronous signal detection circuit according to the third embodiment has the change detecting unit 70 which detects the fall timing of the input signal IN, and the determination unit 60B which increase or decreases the count value of the clock signal CLK, based on the compare signal CP and determines whether the count value is positive or negative. Consequently, the vertical synchronous signal detection circuit has the advantage of being capable of reliably detecting the vertical synchronizing pulse without being affected by noise and outputting the detect signal coincident in timing with the vertical synchronizing pulse. Further, the vertical synchronous signal detection circuit has the advantage that since such average calculation units 30 as those used in the first and second embodiments are not provided, a circuit scale can be reduced.

Figure 5:
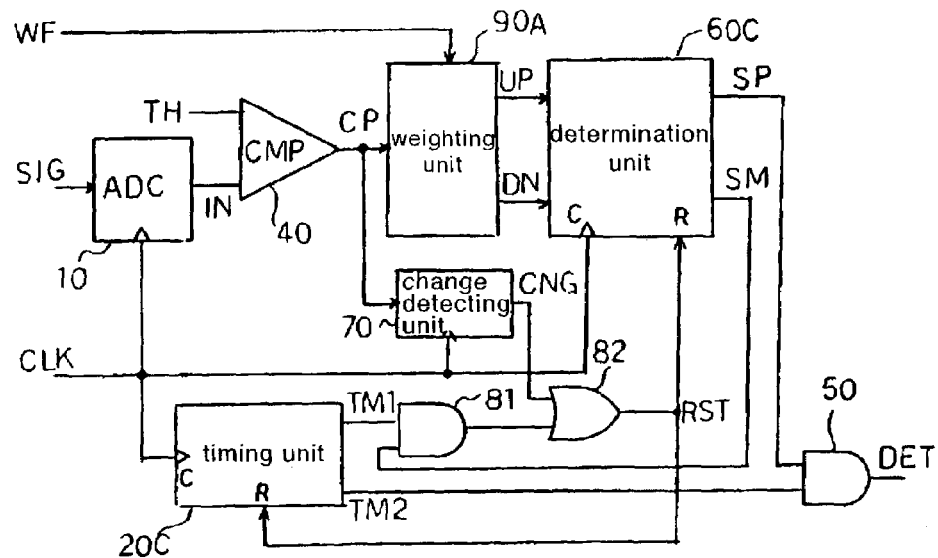
FIG. 5 is a configurational diagram of a vertical synchronous signal detection circuit illustrating a fourth embodiment of the present invention.

FIG. 5 is a configurational diagram of a vertical synchronous signal detection circuit showing a fourth embodiment of the present invention. Elements of structure common to those in FIG. 4 are respectively identified by common reference numerals.

The vertical synchronous signal detection circuit is one wherein a weighting unit 90A and a determination unit 60C are provided as an alternative to the determination unit 60B in FIG. 5.

The weighting unit 90A is one for setting an up number UP and a down number DN for incrementing and decrementing an unillustrated counter in the determination unit 60C, based on a pre-given weighting factor WF. On the other hand, the determination unit 60C increments or decrements the up number UP or the down number DN supplied from the weighting unit 90A from the counter for each timing of a clock signal CLK and outputs signals SP and SM, based on a count value of the counter. The vertical synchronous signal detection circuit is similar in other configuration to that shown in FIG. 4.

The vertical synchronous signal detection circuit is substantially similar in operation to the vertical synchronous signal detection circuit shown in FIG. 4. While, however, the count value of the counter 66 is incremented and decremented one by one according to "H" and "L" of the compare signal CP, respectively in the case of the determination unit 60B of the vertical synchronous signal detection circuit shown in FIG. 4, the count value of the counter is incremented by the up number UP (e.g., 3) when the compare signal CP is of "H", whereas when the compare signal CP is of "L", the count value is decremented by the down number DN (e.g., 2) in the case of the determination unit 60C of the vertical synchronous signal detection circuit. Other operations are similar to those shown in FIG. 4.

As described above, the vertical synchronous signal detection circuit according to the fourth embodiment has the weighting unit 90A for setting the numbers used to increment and decrement the counter according to the clock signal CLK, based on the weighting factor WF. Thus, the vertical synchronous signal detection circuit has the advantage of being capable of performing settings for minimizing the influence of noise owing to the application of the weighting factor WF corresponding-to noise characteristics in addition to an advantage similar to the third embodiment.

Figure 6:
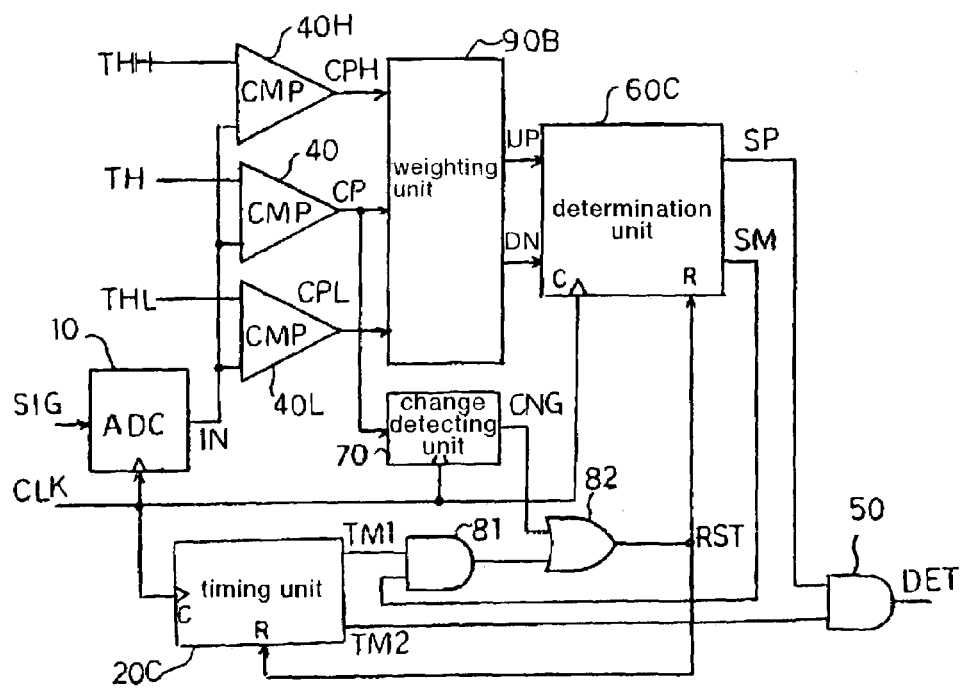
FIG. 6 is a configurational diagram of a vertical synchronous signal detection circuit depicting a fifth embodiment of the present invention.

FIG. 6 is a configurational diagram of a vertical synchronous signal detection circuit showing a fifth embodiment of the present invention. Elements of structure common to those in FIG. 5 are respectively identified by common reference numerals.

The vertical synchronous signal detection circuit is provided with a weighting unit 90B slightly different in function from the weighting unit 90A shown in FIG. 5 as an alternative to the weighting unit 90A and added with two comparators 40H and 40L.

The comparator 40H compares the level of an input signal IN with a threshold level THH slightly higher than a threshold level TH and outputs a compare signal CPH ,corresponding to the result of comparison. The comparator 40L compares the level of the input signal IN with a threshold level THL slightly lower than the threshold level TH and outputs a compare signal CPL corresponding to the result of comparison. These compare signals CPH and CPL are supplied to the weighting unit 90B together with a compare signal CP outputted from a comparator 40.

On the other hand, the weighting unit 90B outputs an up number UP or a down number DN for a determination unit 60C in accordance with combinations of the three compare-signals CPH, CP and CPL.

When, for example, the input signal IN is higher than the threshold level THH, all the compare signals CPH, CP and CPL go "L" and 2 is outputted as the down number DN. When the input signal IN lies between the threshold level THH and the threshold level TH, the compare signal CPH goes "H" and the compare signals CP and CPL go "L", so that 1 is outputted as the down number DN. When the input signal IN lies between the threshold level TH and the threshold level THL, the compare signals CPH and CP are rendered "H" and the compare signal CPL is rendered "L", so that 1 is outputted as the up number UP. Further, when the input signal IN is lower than the threshold level THL, the compare signals CPH, CP and CPL are all brought to "H", so that 2 is outputted as the up number UP. Other configurations are similar to those shown in FIG. 5.

The vertical synchronous signal detection circuit is substantially similar in operation to the vertical synchronous signal detection circuit shown in FIG. 5. While, however, the weighting unit 90A of the vertical synchronous signal detection circuit shown in FIG. 5 determines the incremented or decremented value for the determination unit 60C in accordance with the predetermined weighting factor WF, the weighting unit 90B of the vertical synchronous signal detection circuit sets stepwise the incremented or decremented value for the determination unit 60C according to the magnitude of noise. Thus, the present vertical synchronous signal detection circuit has the advantage that owing to the suitable setting of the incremented or decremented value by the weighting unit 90B, a vertical synchronizing signal can be reliably detected even under the existence of much noise.

Incidentally, the present invention is not limited to the above-described embodiments, and various changes can be made thereto. The following are shown below as their modifications, for example.

The circuit configurations of the timing unit 20A, average calculation unit 30A and determination unit 60A or the like are not limited to those illustrated in the drawings.

The number of clocks such as timing signals TM or the like is not limited to the illustrated values. It is necessary to use suitable values in accordance with the frequency of a clock signal CLK and the system of a vertical synchronizing pulse.

While the level of the input signal IN is divided into four stages by using the three threshold levels in FIG. 6, the number of divisions is arbitrary.

While each of the vertical synchronous signal detection circuits shown in FIGS. 2 through 6 has the ADC 10 for digitizing the composite video signal SIG, it may be configured such that an ADC is provided outside and a digital input signal IN is inputted thereto.

According to each of the first and second embodiments as described above in detail, there are provided an average calculation unit which calculates an average value of levels of an input signal, and a comparator which outputs a synchronous detect signal when the average value falls below a threshold level. Since synchronous levels in a vertical synchronizing pulse result in a constant value or less if averaged even if noise is superimposed thereon, the average of a long period is taken and a suitable threshold level is set, whereby a vertical synchronizing pulse can be reliably detected.

According to each of the third through fifth embodiments, there are provided an updown counter which increments or decrements a count value, based on a compare signal indicative of the result of comparison between an input signal and a threshold level, a timing unit which outputs first and second timing signals in every predetermined number of clocks, and a determination unit which outputs a reset signal and a synchronous detect signal from the count value of the updown counter, based on these timing signals. Consequently, a vertical synchronizing pulse can be reliably detected on a small circuit scale without using a large circuit like the average calculation unit.

What is claimed is:

1. A vertical synchronous signal detection circuit comprising:
   an analog-digital converter receiving a composite video signal and converting the video signal into a digital signal having a vertical synchronizing pulse;
   an average calculation circuit coupled to receive the digital signal, the average calculation circuit calculating an average level of the vertical synchronizing pulse within a predetermined period; and
   a compare circuit connected to the average calculation circuit, the compare circuit comparing a threshold level received thereto with the average level and outputting a synchronous detect signal when the average level falls below the threshold level.

2. A vertical synchronous signal detection circuit according to claim 1, further comprising a timing circuit coupled to receive a clock pulse signal, the timing circuit outputting a timing signal to the average calculation circuit when the predetermined period is passed by counting a number of pulses of the clock pulse signal.

3. A vertical synchronous signal detection circuit according to claim 2, wherein the timing circuit includes:
   a counter coupled for receiving the clock signal, the counter counting the number of pulses of the clock pulse signal and outputting a count number signal; and
   a comparator coupled to receive the count number signal and a predetermined number signal, the comparator outputting the timing signal when the count number signal and the predetermined number signal are matched.

4. A vertical synchronous signal detection circuit according to claim 2, further comprising a gate circuit connected to the timing circuit and the compare circuit, the gate circuit outputting a logical output of the timing signal and the synchronous detect signal.

5. A vertical synchronous signal detection circuit according to claim 2, wherein the analog-digital converter converting the video signal in response to the clock signal.

6. A vertical synchronous signal detection circuit according to claim 1, wherein the average calculation circuit includes:
an adder having a first input terminal coupled to receive the digital signal, a second input terminal and an output terminal;
a register having an input terminal connected to the output terminal of the adder and an output terminal connected to the second input terminal of the adder and a reset terminal coupled to receive the timing signal; and
a divider having an input terminal connected to the output terminal of the register and an output terminal outputting the synchronous detect signal.

7. A vertical synchronous signal detection circuit according to claim 1, wherein the digital signal has a retrace blanking level and a synchronous level, and wherein the threshold level is set between the retrace blanking level and the synchronous level.

8. A vertical synchronous signal detection circuit according to claim 1, wherein the digital signal has the vertical synchronizing pulses during three times of a horizontal scanning period, and wherein the predetermined period is about ½ of the horizontal scanning period.

9. A vertical synchronous signal detection circuit comprising:
an analog-digital converter receiving a composite video signal and converting the video signal into a digital signal having a vertical synchronizing pulse;
an average calculation circuit coupled to receive the digital signal, the average calculation circuit calculating an average level of the vertical synchronizing pulse within a predetermined period;
a timing circuit coupled to receive a clock pulse signal, the timing circuit outputting a first timing signal to the average calculation circuit when the predetermined period is passed by counting a number of pulses of the clock pulse signal and a second timing signal;
a compare circuit connected to the average calculation circuit, the compare circuit comparing a threshold level received thereto with the average level and outputting a synchronous detect signal when the average level falls below the threshold level; and
a decision circuit coupled to receive the synchronous detect signal and the first timing signal, the decision circuit counting the synchronous detect signal in response to the first timing signal.

10. A vertical synchronous signal detection circuit according to claim 9, wherein the timing circuit includes:
a counter coupled for receiving the clock signal, the counter counting the number of pulses of the clock pulse signal and outputting a plurality of count number signals; and
a decoder coupled to receive the count number signals, the decoder outputting the timing signals generated from the count number signals.

11. A vertical synchronous signal detection circuit according to claim 9, further comprising a gate circuit connected to the timing circuit and the decision circuit, the gate circuit outputting a logical output of the second timing signal and an output signal of the decision circuit.

12. A vertical synchronous signal detection circuit according to claim 9, wherein the analog-digital converter converting the video signal in response to the clock signal.

13. A vertical synchronous signal detection circuit according to claim 9, wherein the average calculation circuit includes:
an adder having a first input terminal coupled to receive the digital signal, a second input terminal and an output terminal;
a register having an input terminal connected to the output terminal of the adder and an output terminal connected to the second input terminal of the adder and a reset terminal coupled to receive the timing signal; and
a divider having an input terminal connected to the output terminal of the register and an output terminal outputting the synchronous detect signal.

14. A vertical synchronous signal detection circuit according to claim 9, wherein the digital-signal has a retrace blanking level and a synchronous level, and wherein the threshold level is set between the retrace blanking level and the synchronous level.

15. A vertical synchronous signal detection circuit according to claim 9, wherein the first timing signal is output when every 16 pulses of the clock signal are counted.

16. A vertical synchronous signal detection circuit comprising:
an analog-digital converter receiving a composite video signal and converting the video signal into a digital signal having a vertical synchronizing pulse in response to a clock signal received thereto;
a compare circuit connected to the analog-digital converter, the compare circuit comparing a threshold level received thereto with a level of the digital signal and outputting a detect signal representing the comparison;
a change detection circuit coupled to receive the detect signal, the change detection circuit outputting a change signal when a level of the detect signal is changed;
a timing circuit coupled to receive a clock pulse signal, the timing circuit outputting a first timing signal when the predetermined period is passed by counting a number of pulses of the clock pulse signal and a second timing signal; and
a decision circuit coupled to receive the detect signal and the clock signal, the decision circuit counting the detect signal in response to the clock signal and outputting a comparison signal as a result of a comparison of a predetermined number with the counting result.

17. A vertical synchronous signal detection circuit according to claim 6, wherein the timing circuit includes:
a counter coupled for receiving the clock signal, the counter counting the number of pulses of the clock pulse signal and outputting a plurality of count number signals; and
a decoder coupled to receive the count number signals, the decoder outputting the timing signals generated from the count number signals.

18. A vertical synchronous signal detection circuit according to claim 16, further comprising a gate circuit connected to the timing circuit and the decision circuit, the gate circuit outputting a logical output of the second timing signal and a comparison signal.

19. A vertical synchronous signal detection circuit according to claim 16, wherein the digital signal has a retrace blanking level and a synchronous level, and wherein the threshold level is set between the retrace blanking level and the synchronous level.

20. A vertical synchronous signal detection circuit according to claim 16, wherein the first timing signal is output when every 16 pulses of the clock signal are counted.

21. A vertical synchronous signal detection circuit according to claim 16, wherein the decision circuit includes a weighting circuit coupled to receive the detect signal, the weighting circuit setting a value of the counting based on a weighting factor received thereto.

22. A vertical synchronous signal detection circuit according to claim 21, wherein the compare circuit includes a plurality of compare circuits comparing threshold levels received thereto with the level of the digital signal and outputting detect signals representing the comparison.

* * * * *